(12) United States Patent
Somppi et al.

(10) Patent No.: US 6,374,665 B1
(45) Date of Patent: Apr. 23, 2002

(54) APPARATUS FOR ADJUSTING THE CANT OF AN ANNULAR ARTICLE

(75) Inventors: Kerry Arne Somppi, Cuyahoga Falls; Matthew Alan Treier, Akron, both of OH (US)

(73) Assignee: Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/489,351

(22) Filed: Jan. 21, 2000

(51) Int. Cl.[7] .............................................. G01M 17/02
(52) U.S. Cl. ...................................................... 73/146
(58) Field of Search .......................... 73/146, 856, 857, 73/858, 859

(56) References Cited

U.S. PATENT DOCUMENTS

| 3,581,563 | A | * | 6/1971 | Christie et al. ................ 73/146 |
| 3,726,124 | A | | 4/1973 | Obarski ............................ 73/8 |
| 3,987,672 | A | * | 10/1976 | Loyer ............................ 73/146 |
| 4,344,325 | A | | 8/1982 | Iwama ........................... 73/146 |
| 5,088,321 | A | | 2/1992 | Kajikawa et al. .............. 73/146 |
| 5,347,842 | A | | 9/1994 | Pottinger et al. .............. 73/1 R |
| 5,383,361 | A | * | 1/1995 | Matumoto ..................... 73/471 |
| 5,481,907 | A | | 1/1996 | Chasco et al. ................. 73/146 |
| 6,082,191 | A | * | 7/2000 | Naiferd et al. ................. 73/146 |

* cited by examiner

Primary Examiner—Benjamin R. Fuller
Assistant Examiner—Andre Allen

(57) ABSTRACT

An apparatus 10 for adjusting the cant of the axis of rotation of an annular article with respect to a fixed axis. The apparatus 10 having at least one set of wedge rings 30 disposed between a back plate and a spindle plate. The back plate being fixed with respect to the fixed axis and the spindle plate being fixed with respect to the axis of rotation of the annular article. In a preferred embodiment, the apparatus 10 being capable of adjusting both the slip and camber angles of a tire.

8 Claims, 17 Drawing Sheets

APPARATUS FOR ADJUSTING THE CANT OF AN ANNULAR ARTICLE

TECHNICAL FIELD

This invention relates to an apparatus for adjusting the cant of the axis of rotation of an annular article with respect to a fixed axis, such as the axis of a vehicle axle or a test machine axle. More particularly, this invention relates to an apparatus for adjusting the camber and/or the slip angle of a mounted pneumatic tire.

BACKGROUND ART

In many applications there is a need to adjust the cant of the axis of rotation of an annular article with respect to a fixed axis. One such application is the need to adjust the camber and/or the slip angles of a mounted pneumatic tire for testing. By varying the camber and the slip angles of the tire, tire designers can determine how the particular tire reacts under given conditions. The data obtained from these tests is helpful in designing tires with an improved working footprint. To aid tire designers in quantifying the test data, SAE J670e Vehicle Dynamics Terminology is used as a standard coordinate system. Another application where there is a need to adjust the camber and/or the slip angle of a mounted pneumatic tire is on a vehicle. In racing vehicles, the camber and the slip of each tire may be individually adjusted for specific track conditions. On a passenger vehicle, the camber and ship may be similarly optimized.

A spindle is a mechanism used to hold a wheel to a vehicle or a tire testing machine. The center axis of the spindle is normally the axis of rotation for the wheel, and thus for the tire. The angle of rotation of the wheel can be adjusted with respect to a fixed axis, such as the axis of a vehicle axle or a test machine axle. The ease of adjusting the cant of the wheel with respect to the fixed axis is important. On vehicles, the cant of the wheels may be adjusted by adjusting the tie rods. However, adjusting a tie rod adjusts the cant of both wheels that correspond to that tie rod, an act that, at times, may be undesirable. On tire testing machines, many spindle assemblies must be dismantled and reassembled at the new desired cant because of their inability to be adjusted.

U.S. Pat. No. 3,999,429 entitled "TIRE TESTING APPARATUS" shows a spindle apparatus having a bearing that allows the camber and the slip angle of the tire to be varied. The adjustment of each angle is made by means of two screw-threaded members. Although the patent mentions the spindle as being adjustable, no details are given explaining how the adjusting mechanism works or is controlled. Additionally, the patent gives no information concerning how the given angles are locked into place or how the spindle supports the forces applied by the test vehicle or the tire test machine.

U.S. Pat. No. 5,481,907 entitled "TIRE TESTING SYSTEM HAVING FOCUSED LINKS REDUCING COSINE ERRORS", provides for a tire testing system where both the camber and slip angles are adjustable. The camber and the slip angles are adjusted by the operation of actuators. The patent does not disclose a means of determining the angle of camber and/or slip applied or a means locking a specified camber or slip angle in place. Additionally, since the system is constructed of a number of links, cosine errors, even though reduced in this invention, still occur.

SUMMARY OF THE INVENTION

The apparatus of the invention allows the cant of the axis of rotation of an annular article to be adjusted with respect to a fixed axis. The apparatus has at least one set of wedge rings that are disposed between a back plate and a spindle plate. The back plate, furthest from the annular article, is fixed with respect to the fixed axis and the spindle plate is fixed with respect to the axis of rotation of the annular article. Each wedge ring has a wider portion and a narrower portion.

In the preferred embodiment, the back plate that is fixed with respect to the fixed axis is a second back plate. The spindle plate that is fixed with respect to the axis of rotation of the annular article is a first spindle plate. The apparatus also has a first back plate and a second spindle plate. The first spindle plate is connected to the first back plate. A first set of wedge rings is disposed between the first spindle plate and the first back plate. The second spindle plate is attached to the first back plate. The second spindle plate also is connected to a second back plate, which is located on a side of the second spindle plate opposite the first back plate. A second set of wedge rings is disposed between the second spindle plate and the second back plate.

DEFINITIONS

For ease of understanding this disclosure, the following terms are defined.

"Camber" or "camber angle" means the inclination or tilt of a tire with respect to a plane perpendicular to the ground at a particular point in time when the tire is in motion. It is considered positive when the wheel leans outward at the top and negative when it leans inward. The camber angle is sometimes referred to as the "inclination angle."

"Cant" means an inclination from a given line or a fixed axis. When used as a verb, cant means to set at an angle.

"Equatorial plane (EP)" means the plane perpendicular to the tire's axis of rotation and passing through the center of its tread.

"Footprint" means the contact patch or area of contact of the tire tread with a flat surface at zero speed and under normal load and pressure or under specified load, pressure and speed conditions.

"Lateral" means an axial direction.

"Pneumatic tire" means a laminated mechanical device of generally toroidal shape, usually an open-torus, having beads and a tread and made of rubber, chemicals, fabric and steel or other materials. When mounted on a wheel of a motor vehicle, the tire through its tread provides traction and contains the fluid that sustains the vehicle load.

"Slip" or "slip angle" means the angle between the direction of wheel heading, the X-axis and the direction of wheel travel. The direction of wheel heading is generally in the plane formed by the equatorial plane of the tire.

BRIEF DESCRIPTION OF DRAWINGS

The invention will be described by way of example and with reference to the accompanying drawings in which.

DETAILED DESCRIPTION OF THE INVENTION

The apparatus 10 of this invention allows adjustment of the cant of the axis of rotation of an annular article, such as a tire, with respect to a fixed axis. In a vehicle or on a tire testing machine, the fixed axis is the axis of the axle upon which the apparatus 10 is mounted. The fixed axis is fixed with respect to a back plate of the apparatus 10, and generally extends from the center of the back plate in a perpendicular direction. The back plate to which the fixed axis is referenced is the back plate furthest from the annular article. The axis of rotation of the annular article is fixed with respect to a spindle plate, and generally extends from the center of the spindle plate in a perpendicular direction. The spindle plate to which the axis of rotation of the annular article is fixed is the spindle plate closest to the annular article. When the back plate and the spindle plate of the apparatus 10 are parallel to one another, the axis of rotation of the annular article and the fixed axis are aligned. When the annular article is a tire, the axis of rotation of the tire corresponds to the central axis of a spindle 12 that can be attached to the spindle plate. The apparatus 10 allows adjusting the cant of the axis of rotation of the annular article, with respect to the fixed axis, in any direction. The present invention builds on and extends some of the concepts described in Applicant's co-pending application PCT/US99/03487.

Figure 1:
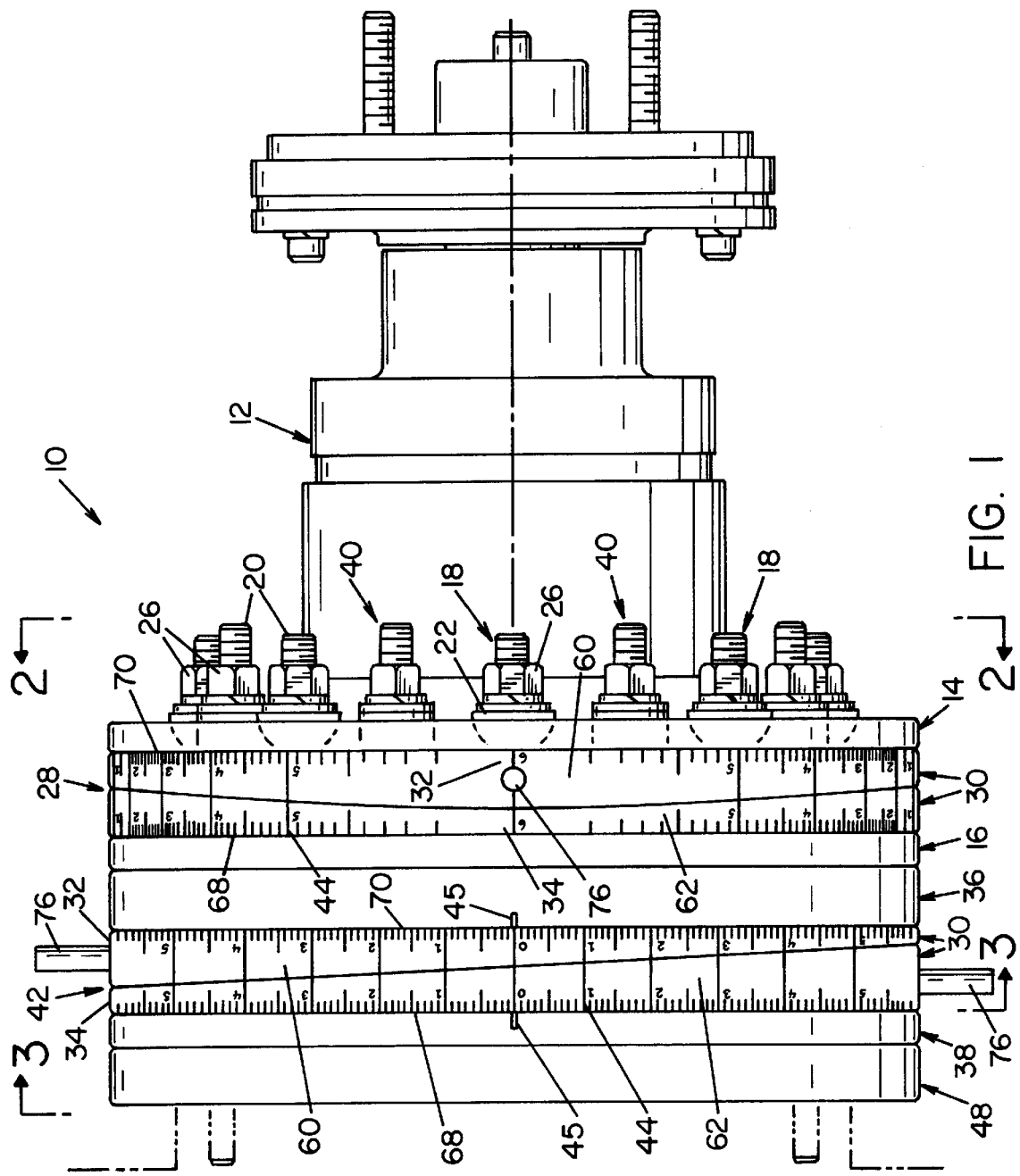
FIG. 1 is a longitudinal view of the invention.
Figure 4:
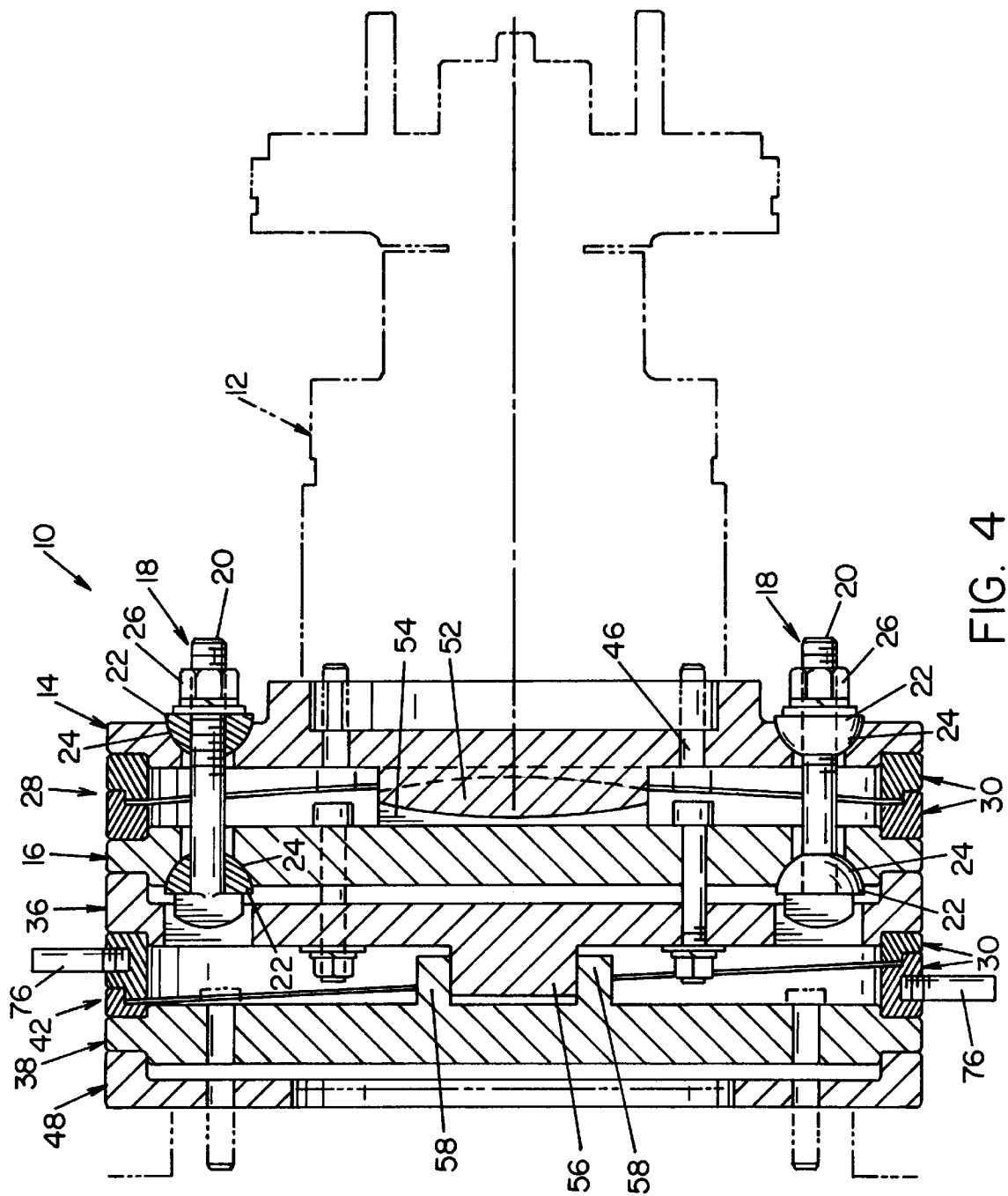
FIG. 4 is a cross-sectional view of the invention taken on the line 4—4 of FIG. 2.

FIG. 1 shows a longitudinal view of the preferred embodiment of the apparatus 10 of the invention. A spindle 12 can be attached to a first spindle plate 14 of the apparatus 10. The first spindle plate 14 is connected to a first back plate 16 by a first locking mechanism 18. The first back plate 16 is located on a side of the first spindle plate 14 opposite the spindle 12. In an illustrated embodiment, the first locking mechanism 18 is a plurality of blind fasteners 20, as shown in FIG. 4. Each of these blind fasteners 20 has two washers 22, each with a spherical portion 24, and a nut 26 for tightening the respective fastener 20. A first set 28 of wedge rings 30 is disposed between the first spindle plate 14 and the first back plate 16. Each wedge ring 30 has a wider portion 32 and a narrower portion 34.

Figure 8:
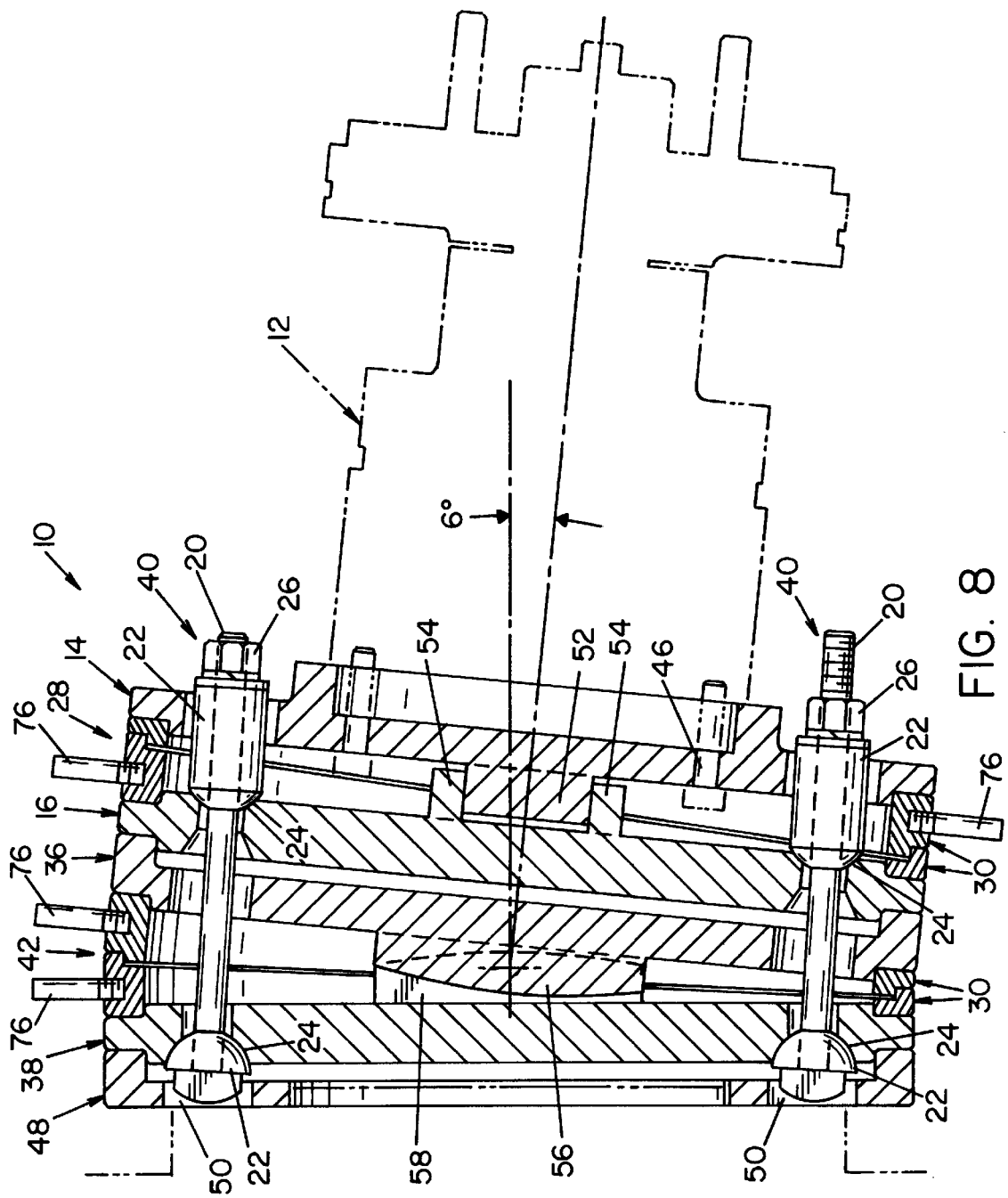
FIG. 8 is a top view of the invention providing a six degree slip angle.

The first back plate 16 is attached to a second spindle plate 36 on a side of the first back plate 16 opposite the first spindle plate 14. The second spindle plate 36 is connected to a second back plate 38 by a second locking mechanism 40. The second back plate 38 is located on a side of the second spindle plate 36 opposite the first back plate 16. A second set 42 of wedge rings 30 is disposed between the second spindle plate 36 and the second back plate 38. The wedge rings 30 of the second set 42 are identical to the wedge rings 30 of the first set 28. In an illustrated embodiment, the second locking mechanism 40 is a plurality of blind fasteners 20, as shown in FIG. 8. Each of these blind fasteners 20 has two washers 22, each with a spherical portion 24, and a nut 26 for tightening onto the respective fastener 20. To allow easier access to the second locking mechanism 40, the second locking mechanism 40 may extend beyond the first spindle plate 14. In the preferred embodiment, this is done by having the respective washers 22 apply pressure to the first back plate 16 which is rigidly connected to the second spindle plate 36. Thus, it is possible for the second spindle plate 36 and the first back plate 16 to be the same piece; however, this may entail the use of different fasteners.

When the wider portion 32 of each wedge ring 30 is aligned with the narrower portion 34 of a corresponding wedge ring 30 in the same set 28, 42, the axis of rotation of the annular article is normal to the first and second back plates 16, 38 and the first and second spindle plates 14, 36. At this position, the indicia 44 indicating zero degrees on both sets 28, 42 of wedge rings 30 are aligned with an angle indicating mark 45 located on at least one of the respective plates corresponding with the set 28, 42 of wedge rings 30. When the second set 42 of wedge rings 30 is rotated, the axis of rotation of the annular article moves to an angle that is not normal to the second back plate 38. In this embodiment, the second back plate 38 is fixed with respect to the fixed axis. When the second set 42 of wedge rings 30 is rotated, the first back plate 16 remains normal to the axis of rotation of the annular article. When the first set 28 of wedge rings 30 is rotated, the axis of rotation of the annular article moves to an angle that is oblique to both the first back plate 16 and the second back plate 38.

Figure 2:
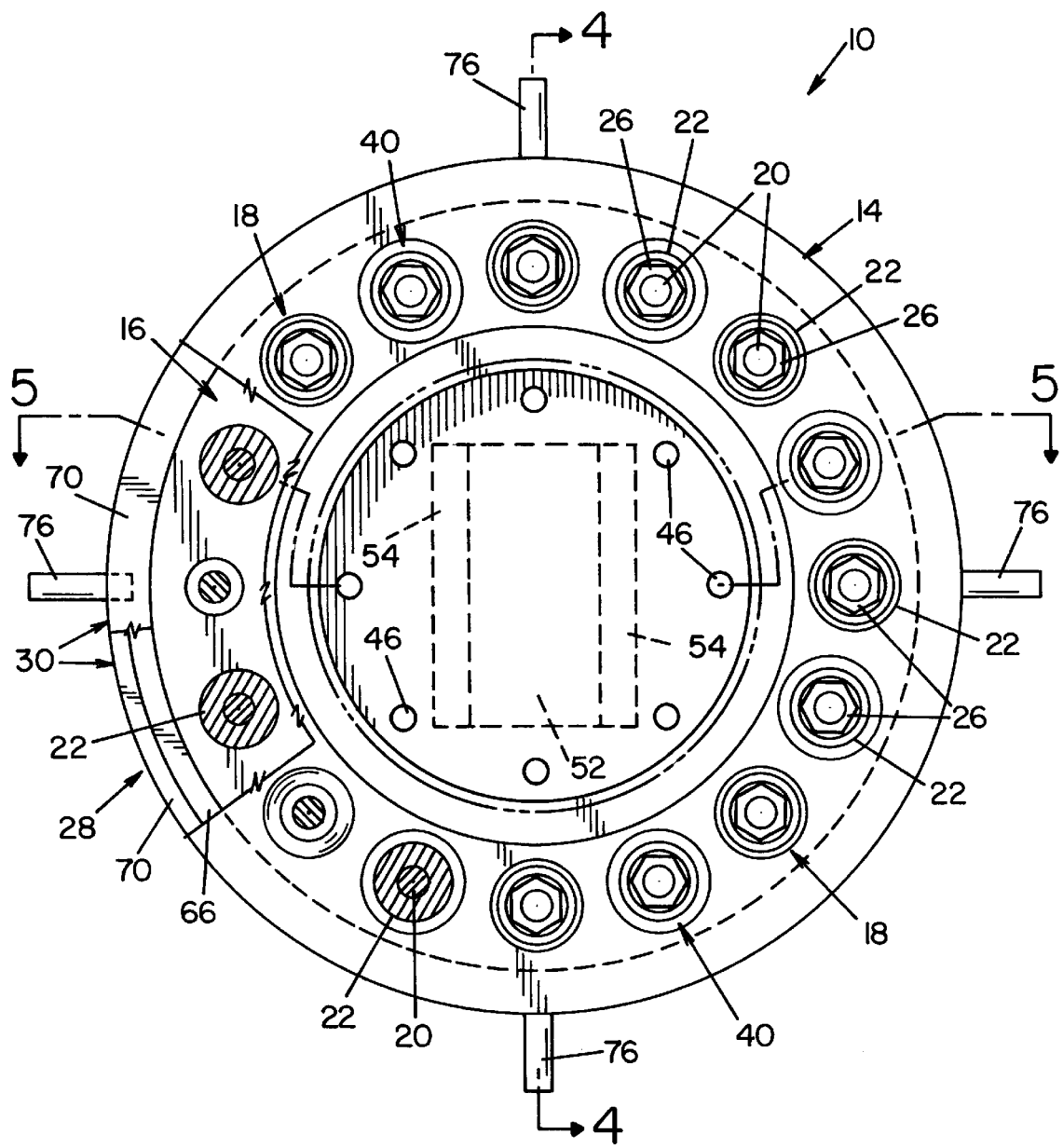
FIG. 2 is a view of the invention taken on the line 2—2 of FIG. 1.

FIG. 2 shows a view of the apparatus 10 taken along line 2—2 of FIG. 1. As can be seen in FIG. 2, the first spindle plate 14 contains a plurality of holes 46 for receiving fasteners for attaching the spindle plate 14 to the spindle 12. FIG. 2 also shows a plurality of fasteners 20, each with a respective washer 22 and a nut 26, forming the first and second locking mechanism 18, 40.

Figure 3:
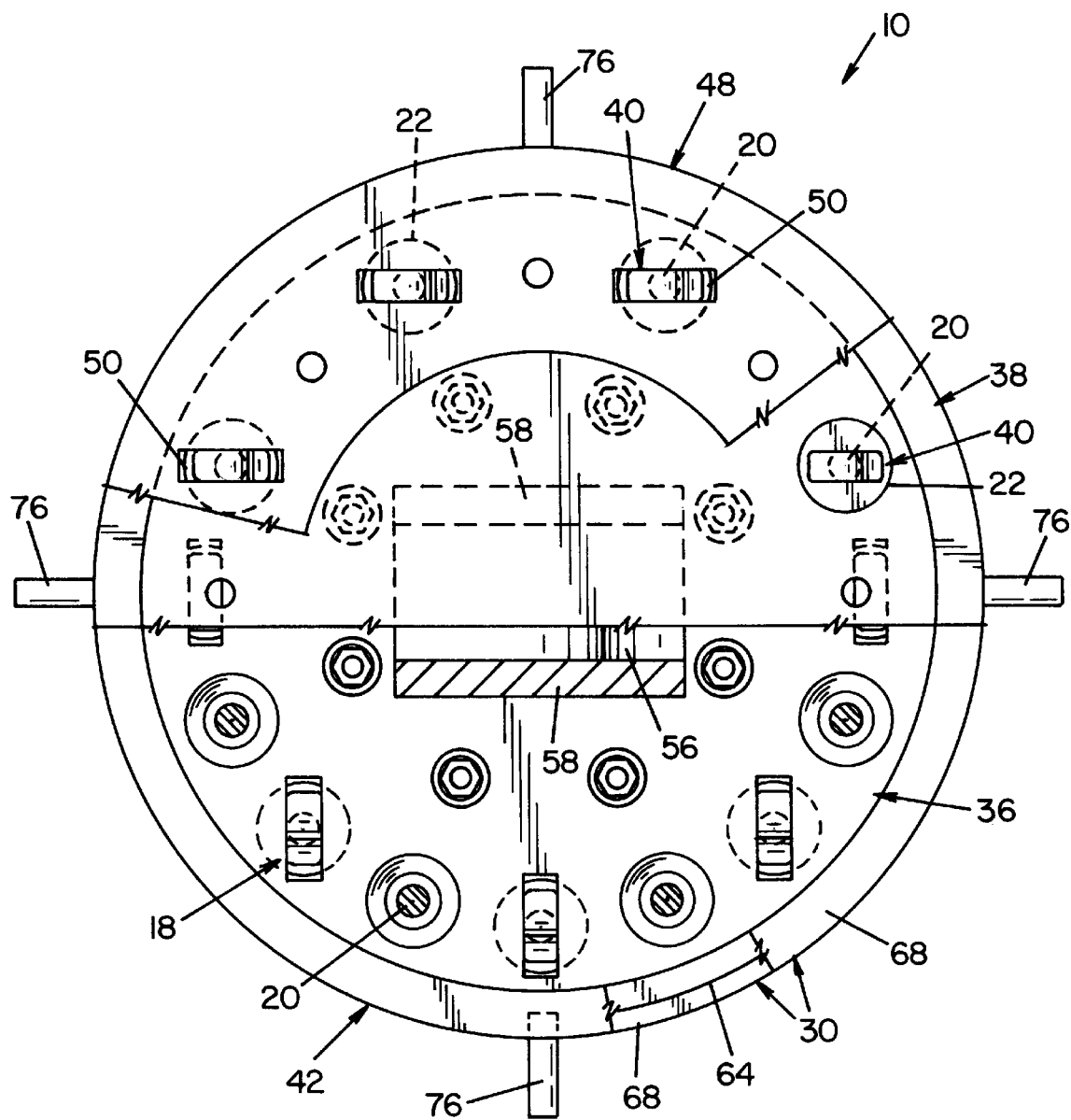
FIG. 3 is a view of the invention taken on the line 3—3 of FIG. 1.
Figure 5:
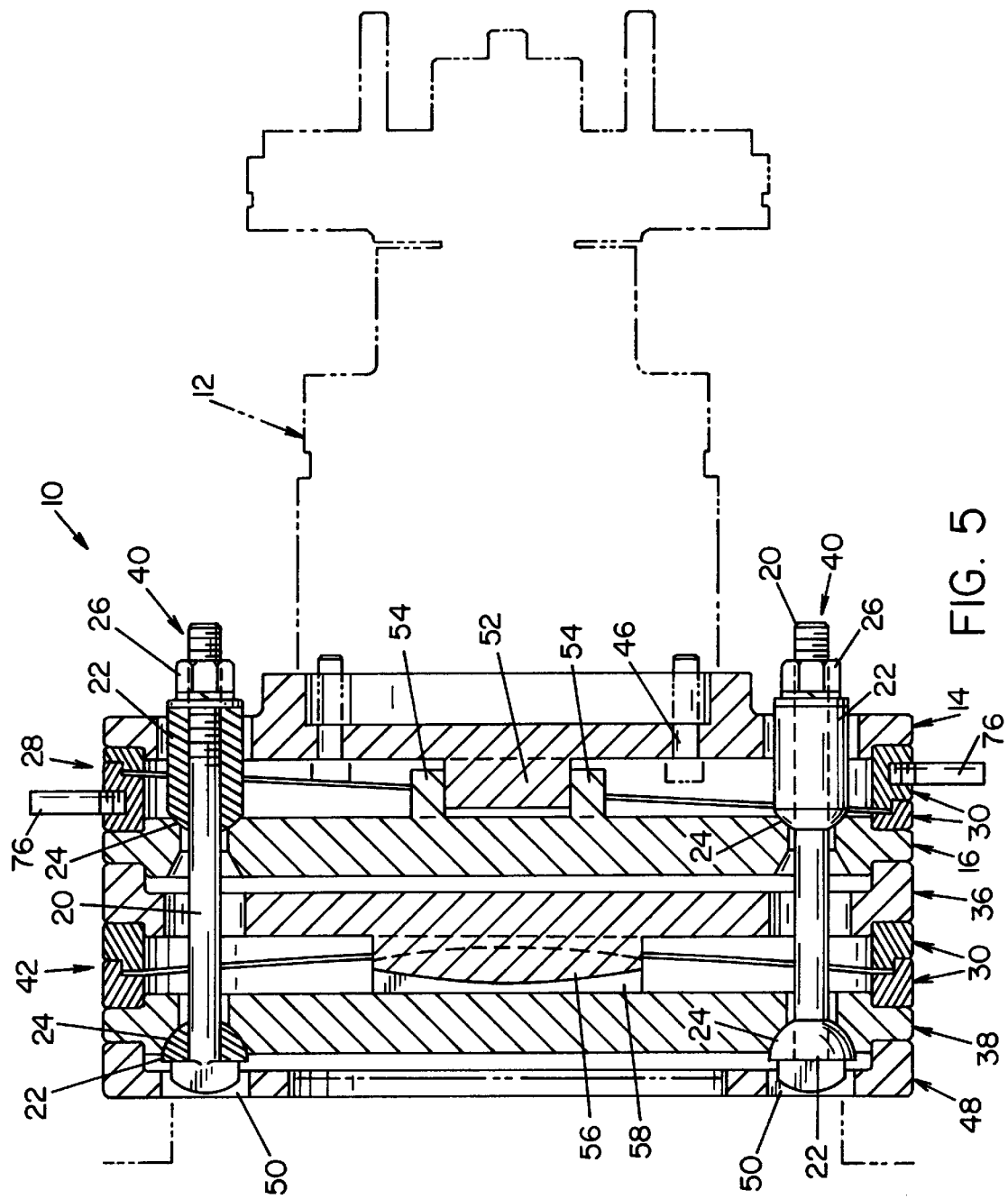
FIG. 5 is a cross-sectional view of the invention taken on the line 5—5 of FIG. 2.

FIG. 3 shows a view of the apparatus 10 taken along line 3—3 of FIG. 1. A support plate 48 attaches to either a vehicle or a tire testing machine. On a side of the support plate 48 opposite the vehicle or the tire testing machine, the support plate 48 is rigidly attached to the second back plate 38, as shown in FIG. 4. As shown in FIG. 5, the support plate 48 has a plurality of holes 50 that give the second locking mechanism 40 enough space to freely rotate. Those skilled in the art will recognize that space for rotation may be made available elsewhere, such as on the vehicle or the tire testing machine. In such an embodiment, the support plate 48 and the second back plate 38 may be combined in the same piece; however, this may entail the use of different fasteners.

FIGS. 4 and 5 show cross-sectional views of the invention. FIG. 5 is a top plan view showing a first boss 52 and a first register 54. The first boss 52 is part of the first spindle plate 14 and the first register 54 is part of the first back plate 16. When the first boss 52 and the first register 54 are connected, the combination allows canting of the axis of rotation of the annular article in a first direction. FIG. 4 shows a second boss 56 and a second register 58 which when connected, allows canting of the axis of rotation of the annular article in a second direction, shown as a direction perpendicular to the first direction. When the annular article is a tire, this cant is called either slip or camber, depending on the direction of the cant. As seen, the second boss 56 is part of the second spindle plate 36 and the second register 58 is part of the second back plate 38. Although a boss and register combination is preferred in the invention, any device that allows a controlled movement in a specific direction will work sufficiently.

Figure 13:
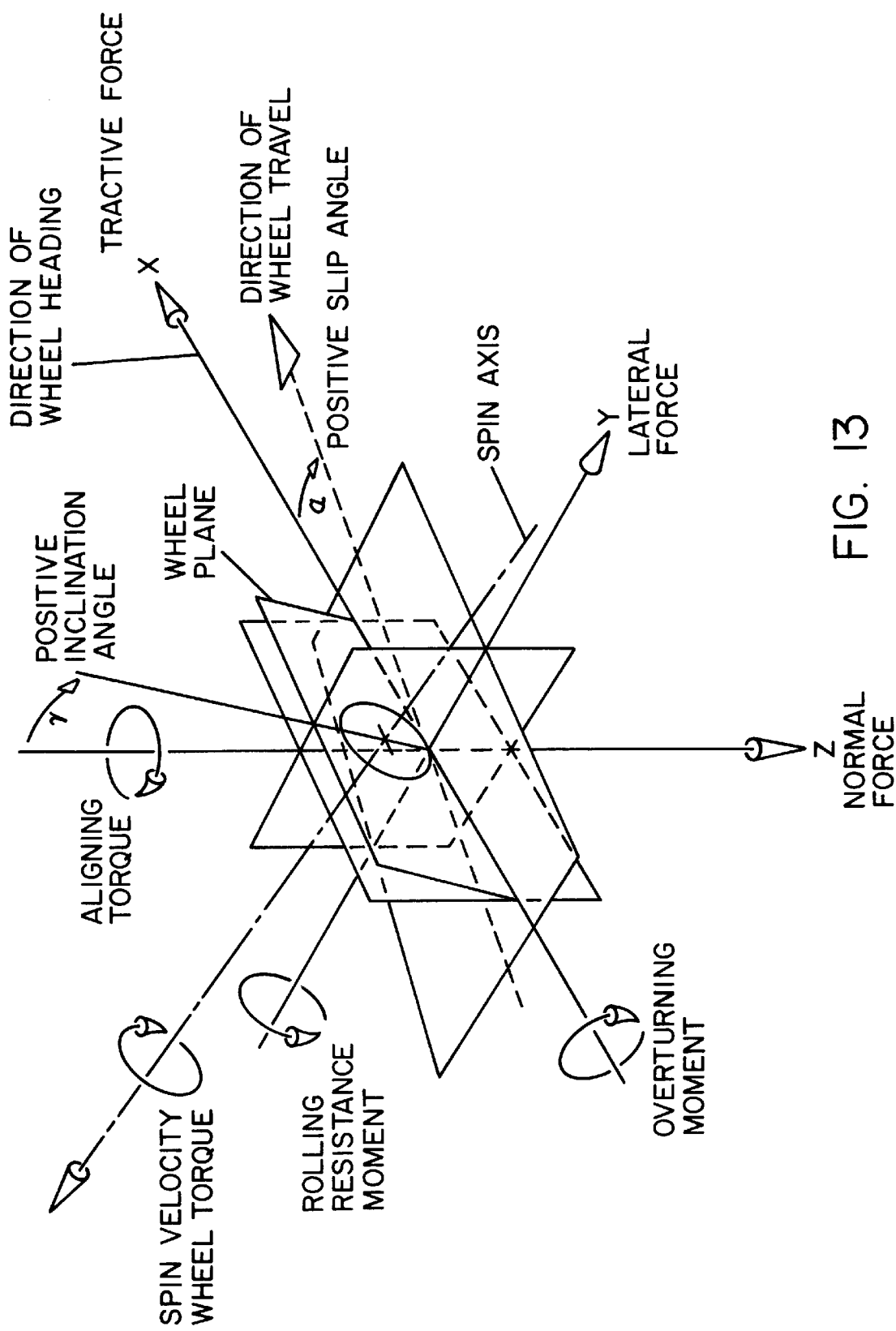
FIG. 13 graphically depicts the SAE J670e Coordinate System.

When the apparatus 10 is used on a vehicle or a tire testing machine, it is preferred that the second boss 56 and register 58 combination allows canting of the axis of rotation of the tire to cause the slip angle, and the first boss 52 and register 54 combination allows canting of the axis of rotation of the tire to cause the camber angle. This ensures that the canting of the tire follows the SAE J670e standard. In the SAE standards, the X-axis and the Y-axis are always located in the plane of the road, the X-Y plane, and depend only upon the heading of the tire. The X-axis is defined by the direction of the tire heading and the Y-axis is perpendicular to the X-axis in the plane of the road. The Z-axis is always perpendicular to the plane of the road, the X-Y plane, and never moves. In the illustrated embodiment of the present invention, both the camber and the slip angles are adjusted in the same apparatus 10. When the second boss 56 and register 58 combination is moved by rotation of the second set 42 of wedge rings 30, the orientation, with respect to the road surface, the X-Y plane, of the first set 28 of wedge rings 30 and the axis of rotation of the tire is changed. As shown in FIG. 13, the slip angle $\alpha$ is measured in the road surface, the X-Y plane, and is created by rotation about the Z-axis as defined in the SAE standards. When the movement of the second boss 56 and register 58 combination causes the slip angle, the movement is rotation about the Z-axis. However, if the movement of the second boss 56 and register 58 combination causes the camber angle, the first boss 52 and register 54 combination, which would control slip, is shifted with the movement of the second boss 56 and register 58 combination in the camber direction. Thus, the axis about which the slip angle is rotated is not the Z-axis as defined in the SAE standards but is instead a new axis which is angled from the SAE Z-axis by the camber angle $\gamma$, shown by the line labeled "positive inclination angle" in FIG. 13. As such, to ensure compliance with the SAE standards, the first boss 52 and register 54 combination preferably causes the camber angle and the second boss 56 and register 58 combination causes the slip angle.

Figure 10:
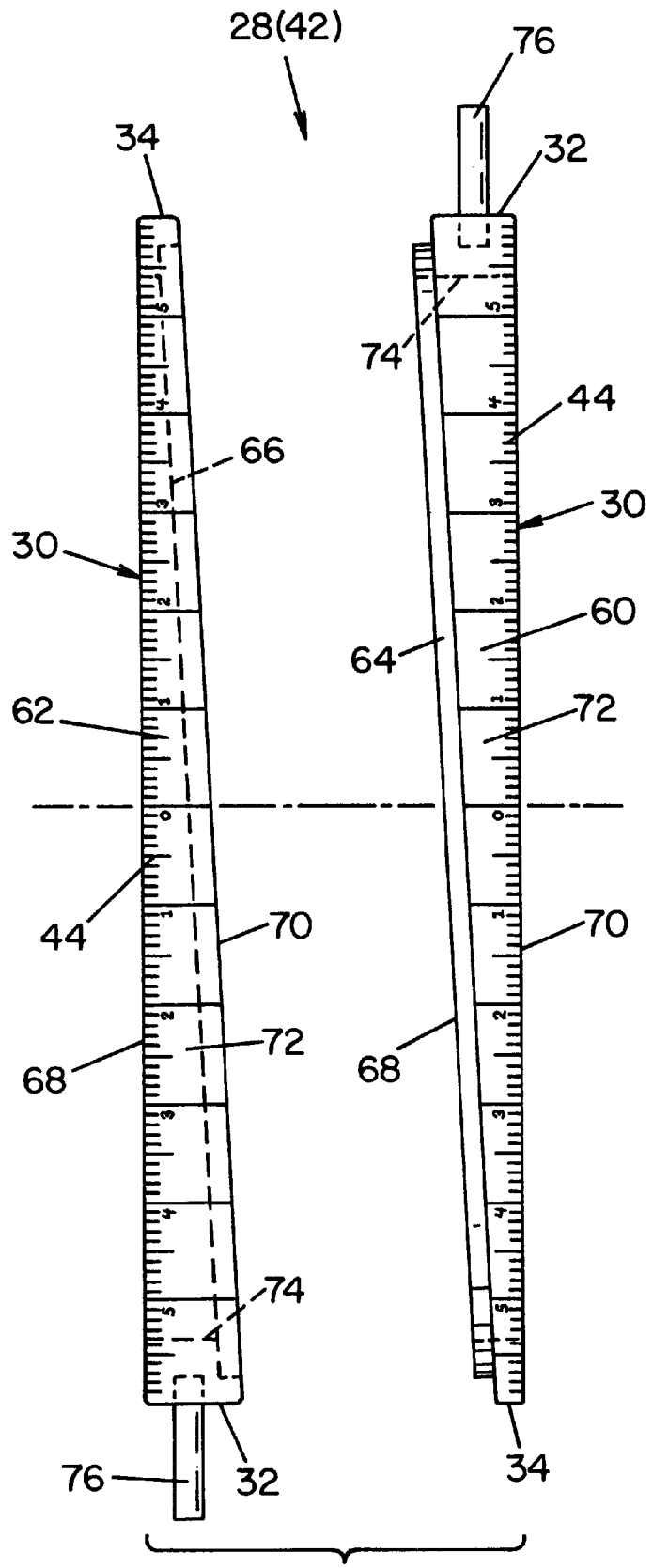
FIG. 10 is a detached and exploded view of a set of wedge rings.
Figure 11:
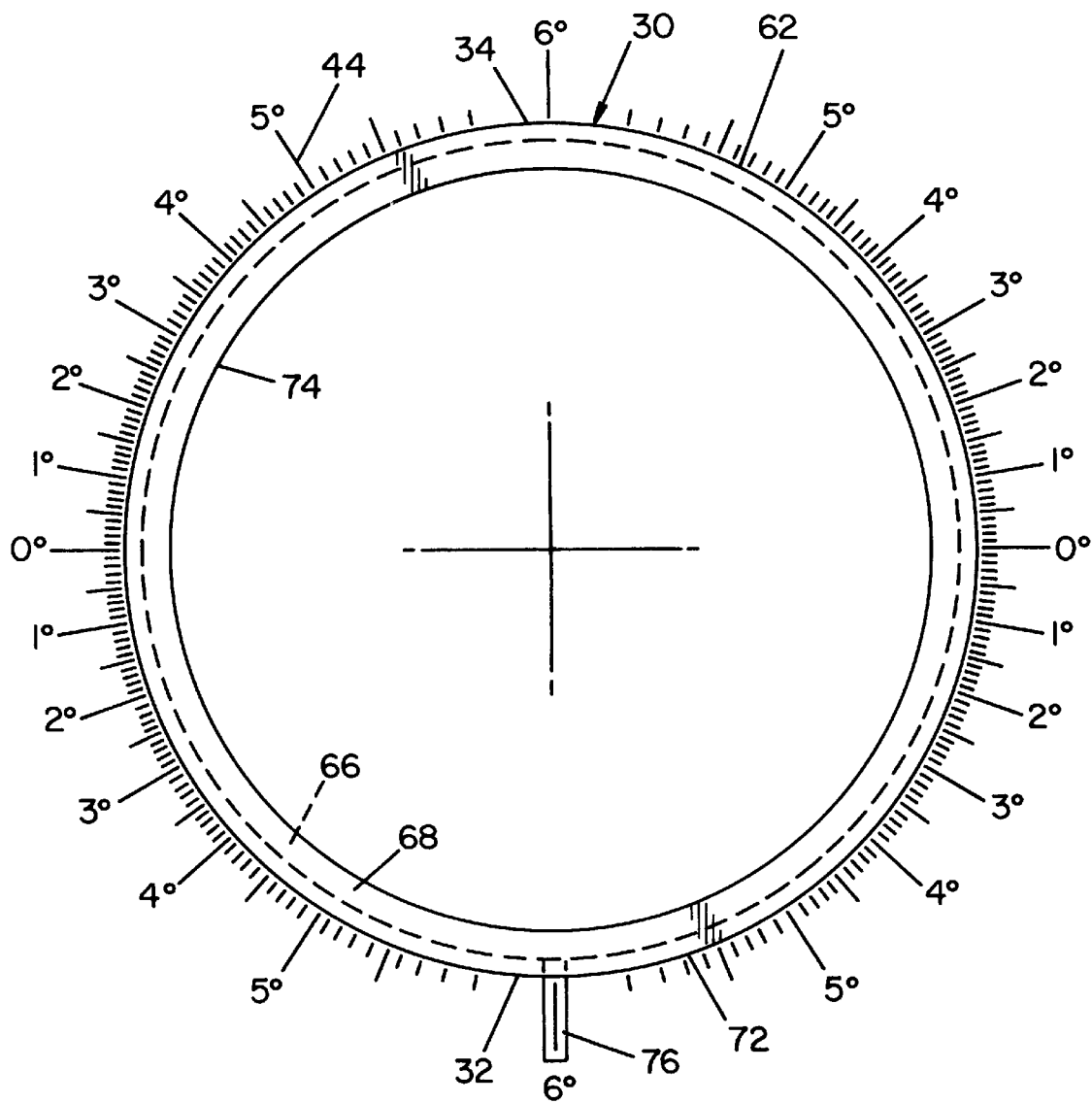
FIG. 11 is an end view of a respective wedge ring showing the indicia.
Figure 12A:
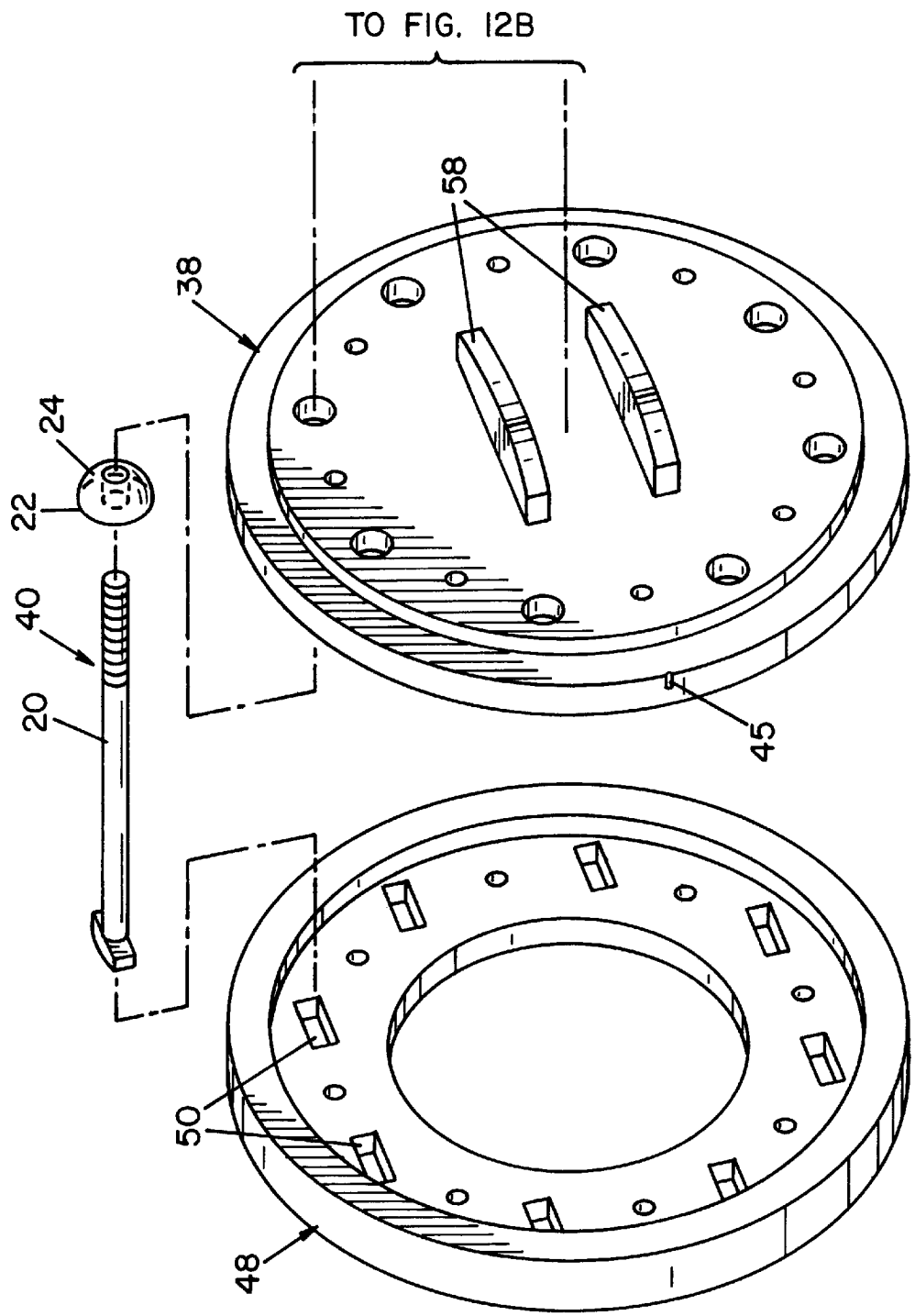
FIGS. 12A–12E show an exploded view of the invention.
Figure 12B:
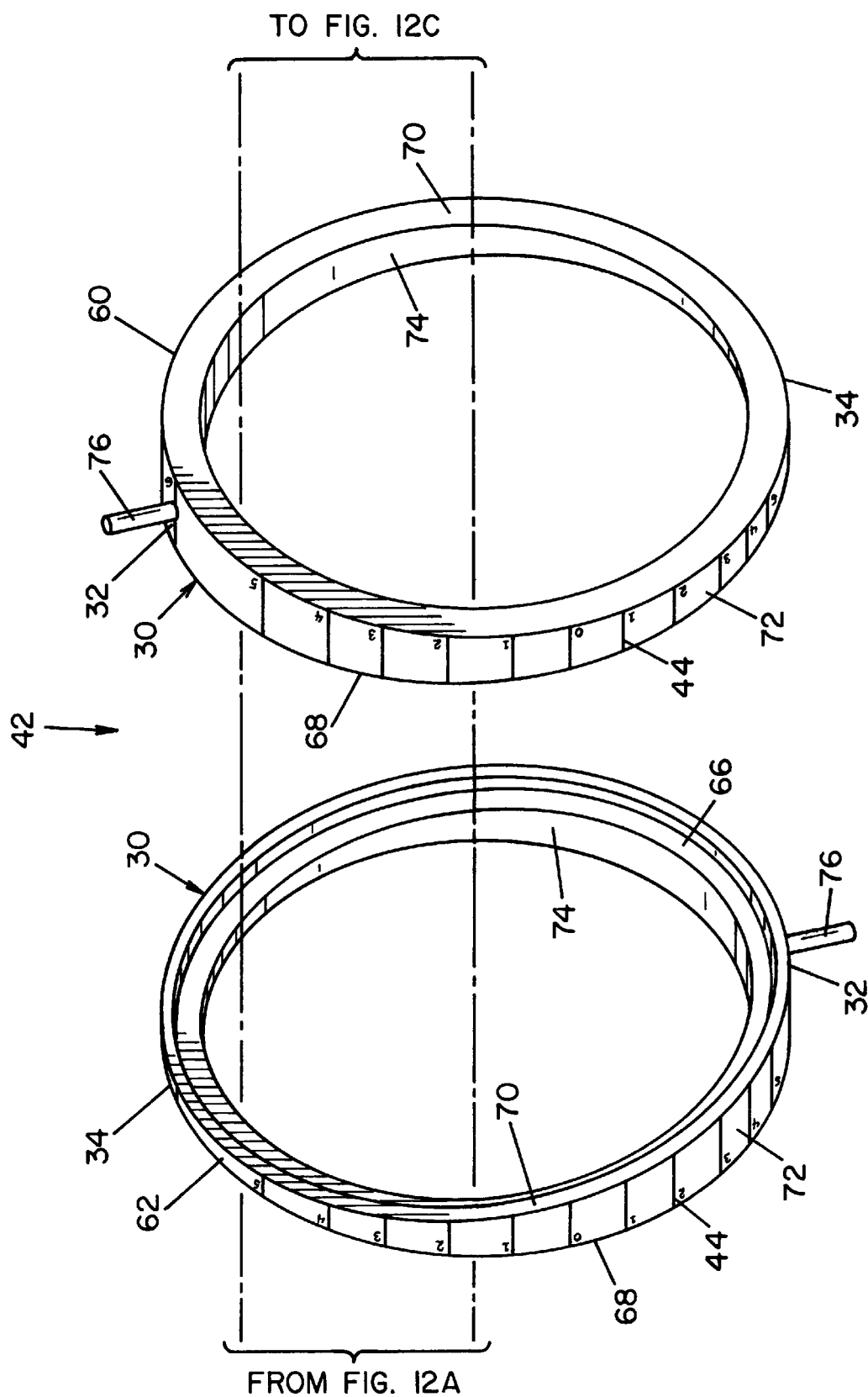
Figure 12C:
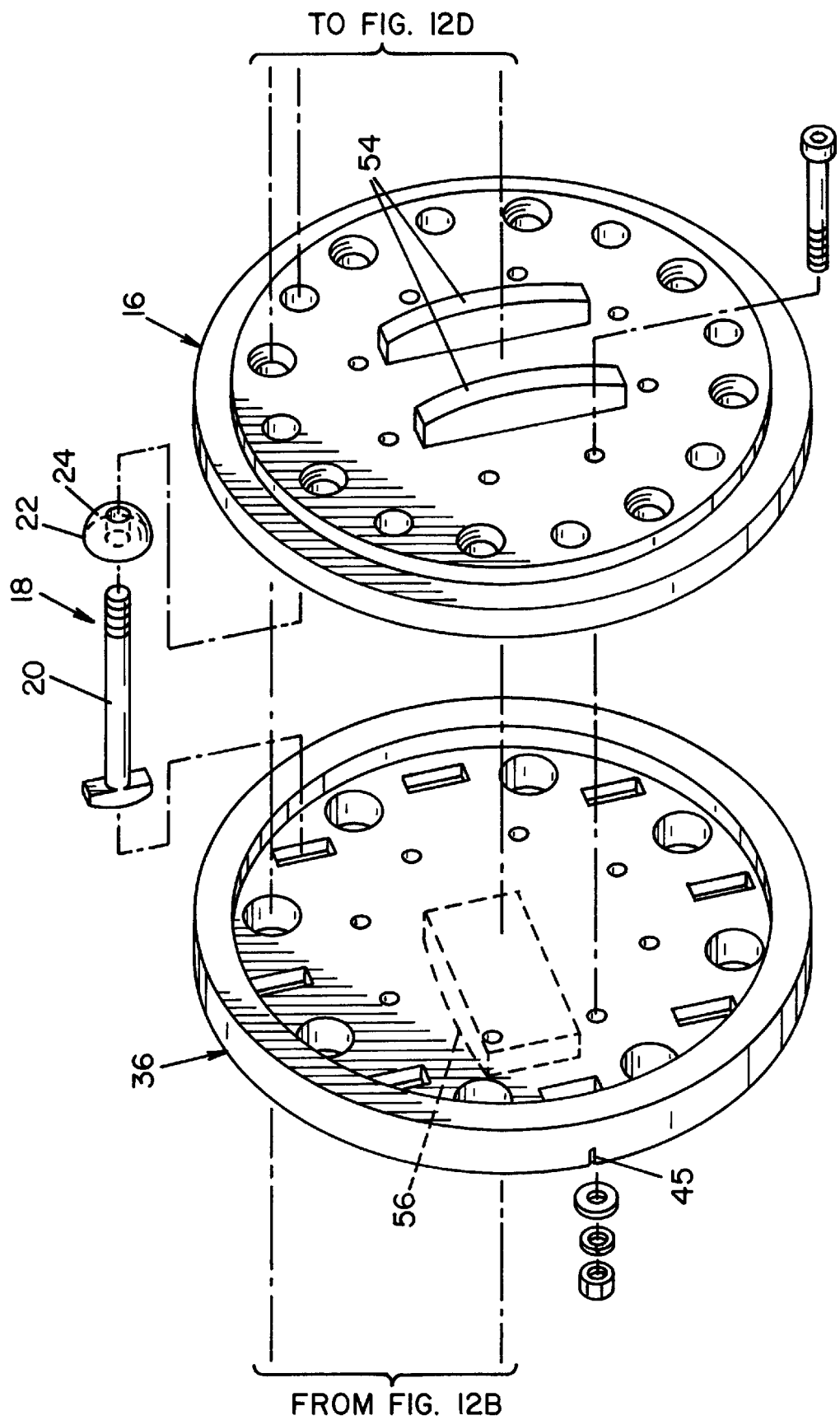
Figure 12D:
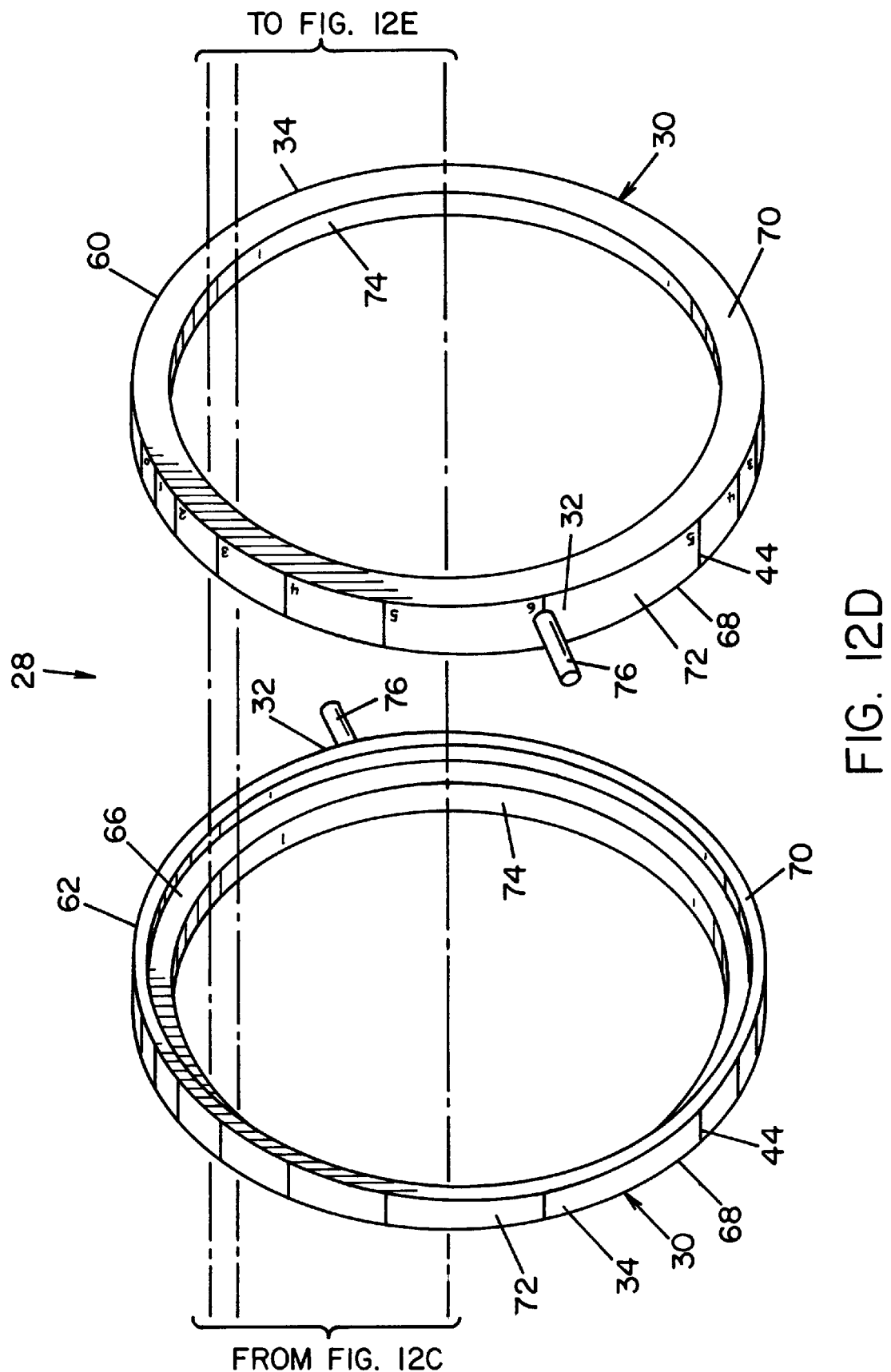
Figure 12E:
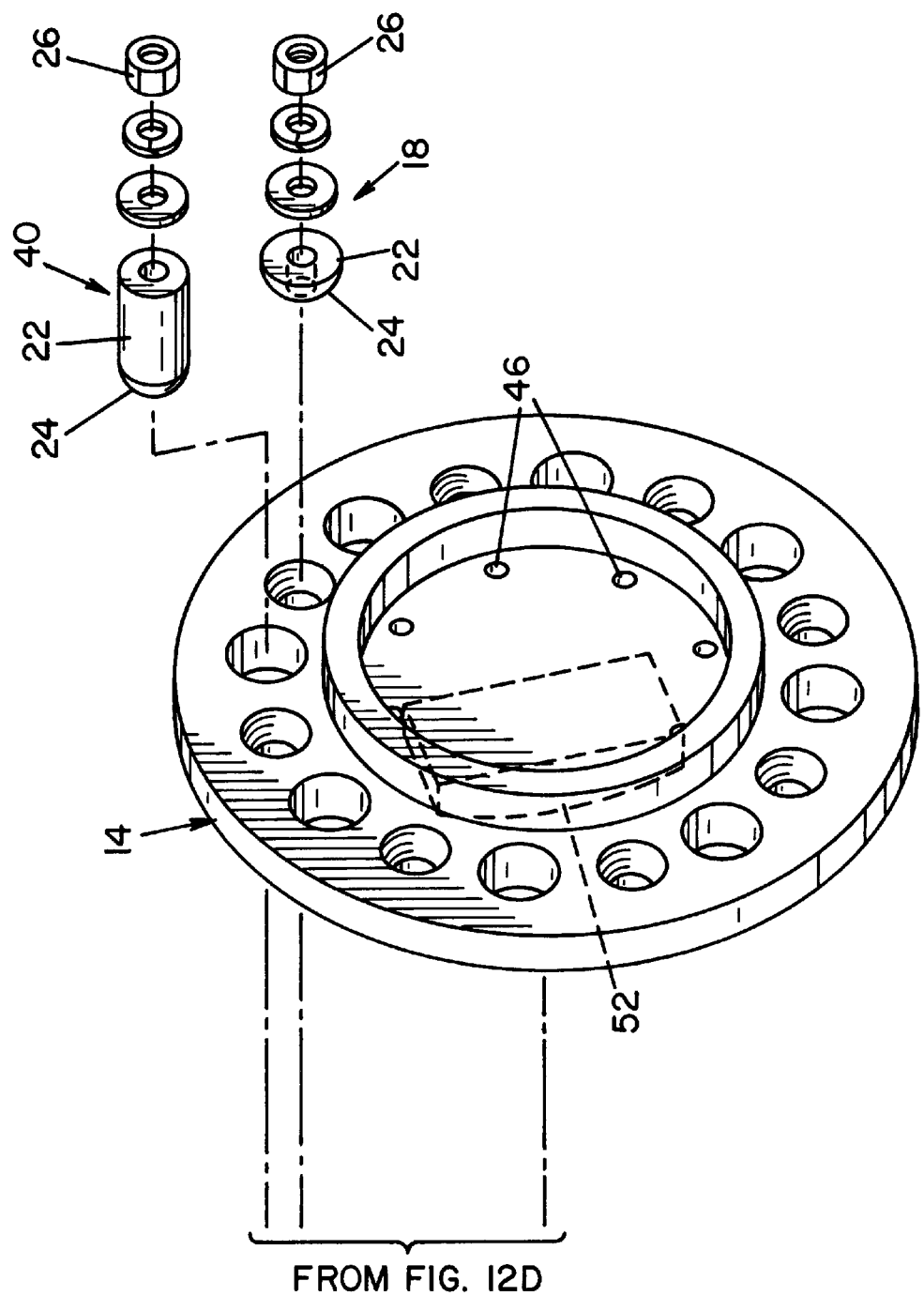

With reference to FIGS. 10 and 11, each set 28, 42 of wedge rings 30 consists of at least two wedge rings 30. A first wedge ring 60 is provided with a boss 64 which is adapted to engage a register 66 of a second wedge ring 62. Each wedge ring 30 has a wider portion 32, a narrower portion 34, a back plate side 68, a spindle plate side 70, an outer surface 72, and an inner surface 74. The back plate side 68 is located nearest to the respective back plate 16, 38 for that set 28, 42 of wedge rings 30 and the spindle plate side 70 is located nearest to the respective spindle plate 14, 36 for that set 28, 42 of wedge rings 30. The indicia 44 used to display the respective angle caused by each set 28, 42 of wedge rings 30 are located on the outer surface 72 of each wedge ring 30. The indicia 44 are located nearer the back plate side 68 of the second wedge ring 62 and nearer the spindle plate side 70 of the first wedge ring 60. Each wedge ring 30 has a rotating means, such as the handle 76 depicted in FIGS. 10 and 11. When the respective locking mechanisms 18, 40 are loosened, the respective sets 28, 42 of wedge rings 30 may be rotated to change the cant of the axis of rotation of the annular article with respect to the fixed axis. When the cant is changed, each first wedge 60 ring must be rotated in an equal and opposite direction as each second wedge ring 62. The angle of movement is displayed by the indicia 44 of the first and second wedge rings 60, 62 aligning an angle indicating mark 45 located on at least one of the respective plates corresponding to that set 28, 42 of wedge rings 30. In the illustrated embodiment, this equal and opposite movement of the wedge rings 30 is required because of the restricted movement resulting from use of the boss and register combinations. Thus, when the indicia 44 indicating three degrees on the first wedge ring 60 is aligned with the indicia 44 indicating three degrees on the second wedge 62, the angle of the cant of the axis of rotation of the annular article is three degrees in the respective direction. Those skilled in the art will recognize that alternative arrangements may be used.

Figure 6:
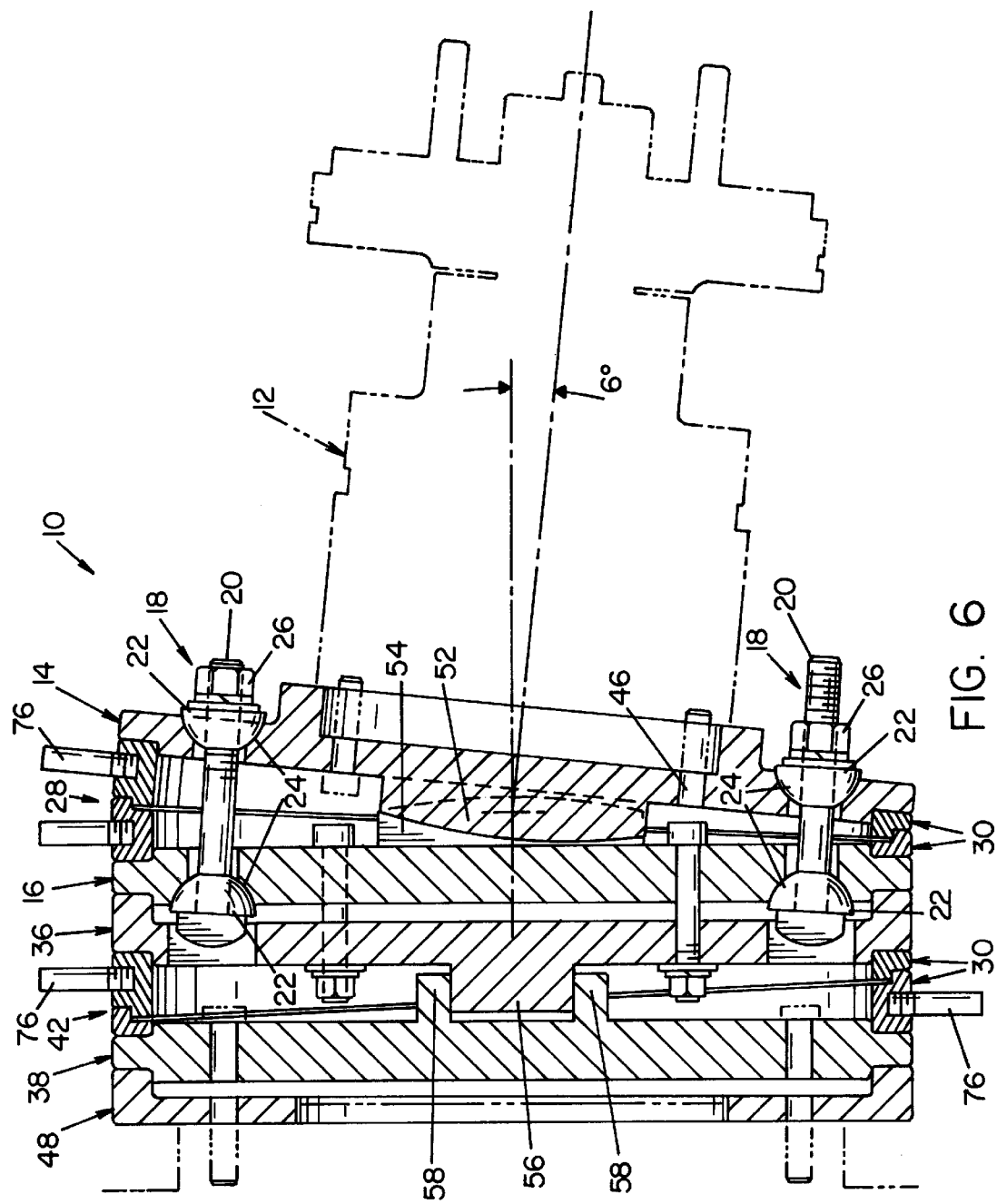
FIG. 6 is a longitudinal view of the invention providing a positive six degree camber angle.
Figure 7:
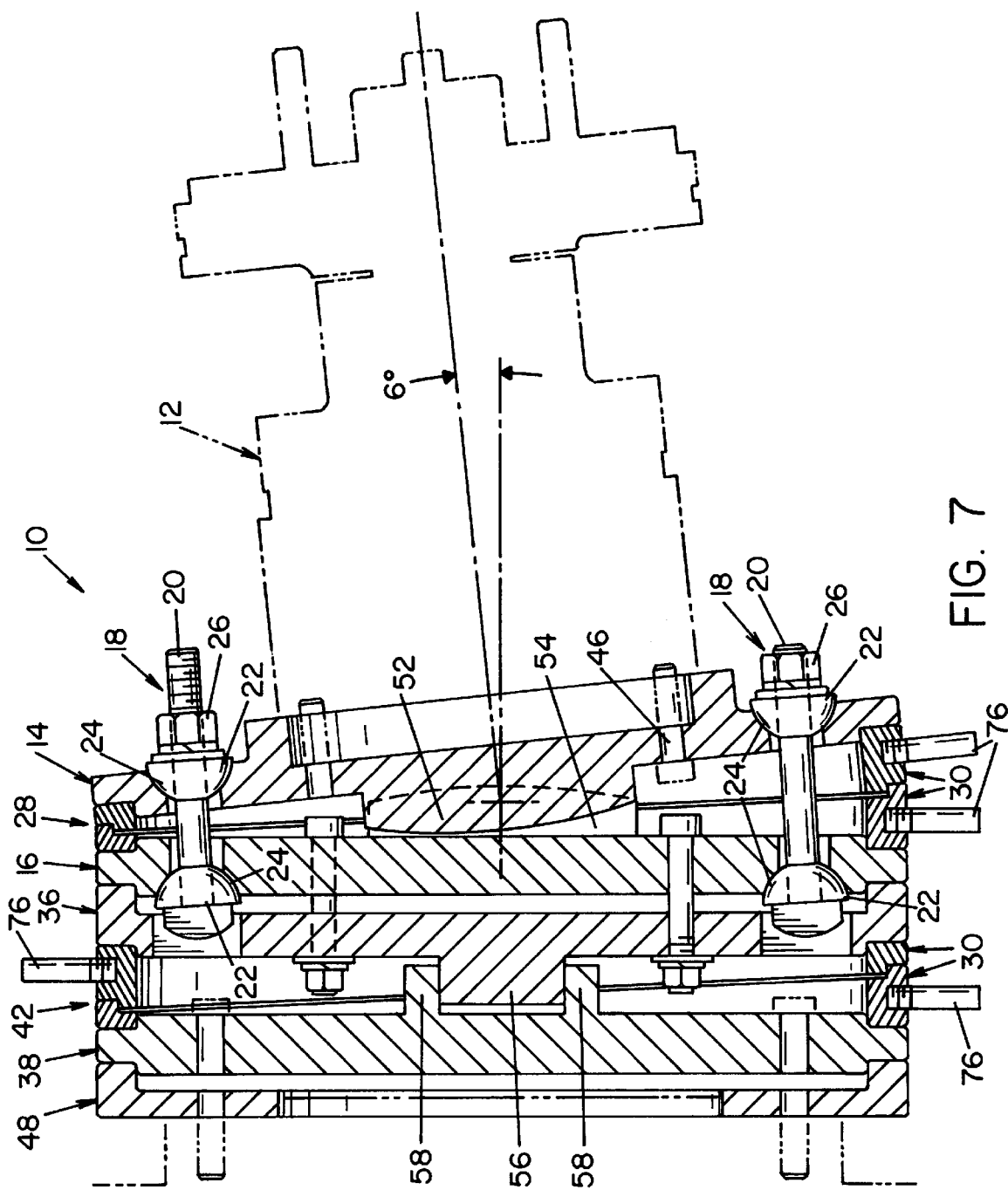
FIG. 7 is a longitudinal view of the invention providing a negative six degree camber angle.
Figure 9:
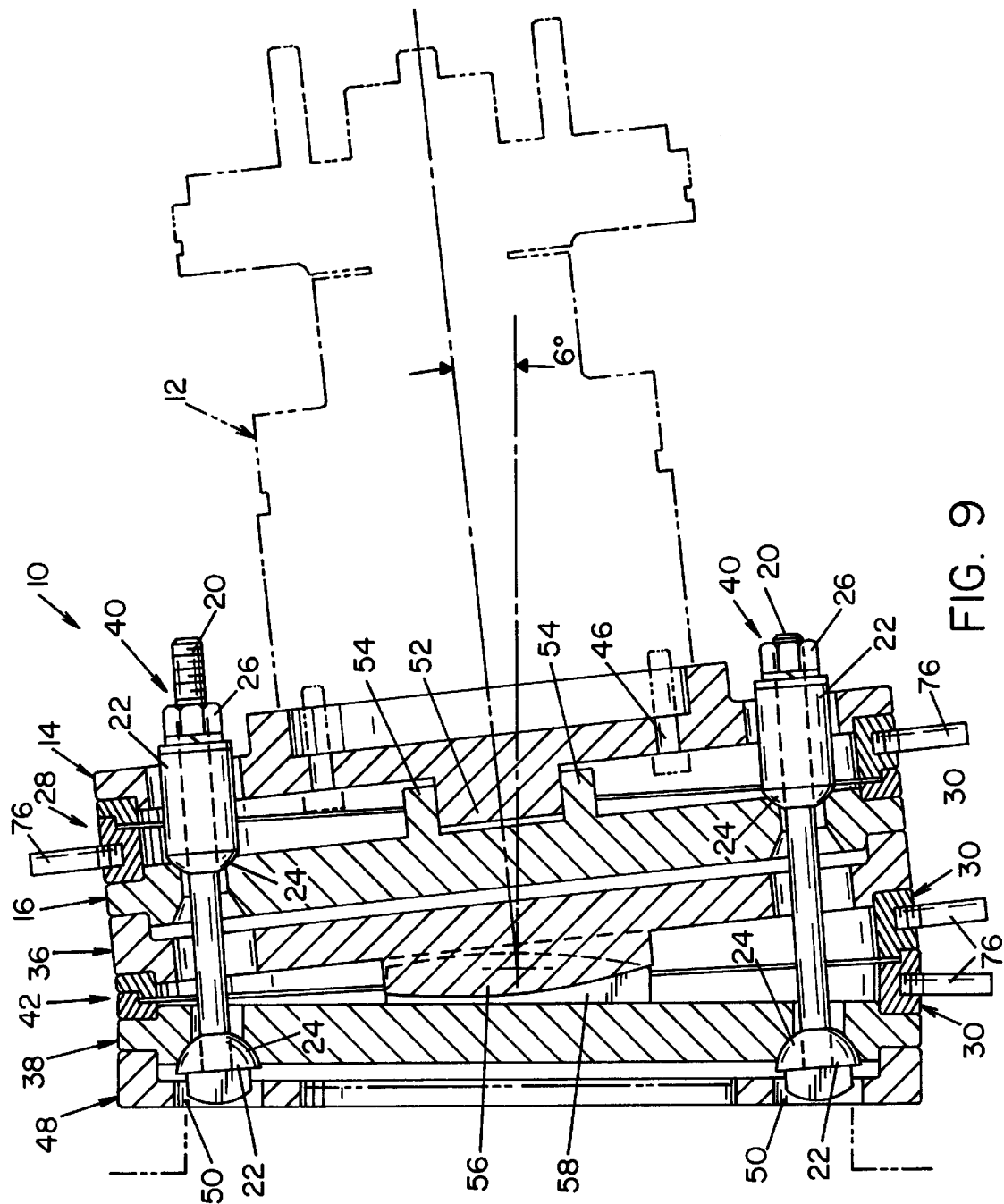
FIG. 9 is a top view of the invention providing a six degree slip angle in a direction opposite that shown in FIG. 8.

FIGS. 6 to 9 illustrate how adjustment of the respective wedge rings 30 changes the cant of the axis of rotation of a tire. Here, the cant illustrates changes in the camber and the slip angles. FIGS. 6 and 7 show side views of the invention with a positive and negative camber angle. FIGS. 8 and 9 show top views of the invention with opposite slip angles. Although the illustrations only demonstrate adjustment of each angle to six degrees, the invention theoretically allows adjustment of each angle up to ninety degrees, limited only by practical application. When the respective set 28, 42 of wedge rings 30 is locked into place, by tightening the respective locking mechanisms 18, 40, the axis of rotation of the tire is canted in each particular direction at the angle indicated by the indicia 44. Thus, if the second set 42 of wedge rings 30 is rotated to a three degree slip angle, the axis of rotation of the tire will have a three degree slip angle with respect to the fixed axis. If the first set 28 of wedge rings 30 is at a four degree camber angle, the axis of rotation of the tire will also have a four degree camber angle with respect to the fixed axis.

FIG. 12 shows an exploded view of a preferred embodiment of the invention. As shown, the locking mechanisms 18, 40 are blind fasteners 20. The use of blind fasteners 20 makes the apparatus 10 easy to build and allows for changing both the slip and camber angles with access to only one side of the apparatus 10. The washers 22, each with a spherical portion 24, allows each of the fasteners 20 to make secure contact with the respective plates at all possible angles.

The method of adjusting the cant of the axis of rotation of an annular article with respect to a fixed axis, using the apparatus 10, includes the steps of: rotating the first set 28 of wedge rings 30 to a first predetermined angle; locking the first set 28 of wedge rings 30 at the predetermined angle; rotating the second set 42 of wedge rings 30 to a second predetermined angle; and locking the second set 42 of wedge rings 30 at the second predetermined angle. The steps of rotating the first and second sets 28, 42 of wedge rings 30 can further include indicating the angle of rotation with indicia 44 located on each wedge ring 30 and aligning the indicia 44 of the respective wedge rings 30 to correspond with the respective predetermined angle.

What is claimed is:

1. An apparatus comprising an annular article having a rotational relationship with a spindle and means for adjusting the cant of an axis of rotation of the annular article on said spindle, the apparatus comprising:

at least one set of wedge rings disposed between a back plate and a spindle plate, the back plate being fixed with respect to a fixed axis, the spindle plate being fixed with respect to an axis of rotation of said annular article, each wedge ring having a wider portion and a narrower portion.

2. An apparatus as in claim 1 further comprising:

a locking member having a locking mechanism wherein each wedge ring is rotatable when a locking mechanism is loosened, the spindle plate being normal to a fixed axis when a narrower portion of each wedge ring is aligned with a wider portion of another wedge ring in a respective set of wedge rings, the spindle plate being canted with respect to the fixed axis when the narrower portion of each wedge ring is not aligned with the wider portion of said another wedge ring in the set of wedge rings.

3. An apparatus as in claim 1, further comprising:

a second back plate fixed with respect to the fixed axis, a first spindle plate fixed with respect to the axis of rotation of the annular article, the apparatus further having a first back plate and a second spindle plate, the first spindle plate being connected to the first back plate, a first set of wedge rings being disposed between the first spindle plate and the first back plate, the second spindle plate being attached to the first back plate, the second spindle plate further being connected to a second back plate, the second back plate being located on a side of the second spindle plate opposite the first back plate, a second set of at least two wedge rings being disposed between the second spindle plate and the second back plate.

4. An apparatus as in claim 3 further comprising:

an axis of rotation of the annular article having an angle oblique to the second back plate when the second set of at least two wedge rings is rotated.

5. An apparatus as in claim 4 further comprising:

an axis of rotation of the annular article having an angle oblique to both the first back plate and the second back plate when the first set of at least two wedge rings is rotated.

6. An apparatus as in claim 3 further comprising:

a base and register combination interconnecting the first back plate and the first spindle plate for adjusting the spindle relative to the first back plate in a first direction.

7. An apparatus as in claim 3 further comprising:

a boss and register combination interconnecting the second back plate and the second spindle plate for limiting adjustment of the spindle relative to the second back plate to a second direction.

8. An apparatus as in claim 3 further comprising:

indicia indicating an angle of an axis of rotation of the annular article relative to the first back plate, and indicia indicating an angle of the axis of rotation of the annular article relative to the second back plate.

* * * * *